United States Patent [19]

Shiraishi et al.

[11] 4,246,615
[45] Jan. 20, 1981

[54] SYSTEM FOR RECORDING AND/OR REPRODUCING AN AUDIO SIGNAL WHICH HAS BEEN CONVERTED INTO A DIGITAL SIGNAL

[75] Inventors: Yuma Shiraishi, Kamakura; Akira Hirota, Chigasaki, both of Japan

[73] Assignee: Victor Company of Japan, Limited, Yokohama, Japan

[21] Appl. No.: 971,004

[22] Filed: Dec. 15, 1978

[30] Foreign Application Priority Data

Dec. 16, 1977 [JP] Japan .............................. 52-151550
Dec. 26, 1977 [JP] Japan .............................. 52-157104

[51] Int. Cl.$^3$ ...................... H04N 5/76; H04N 7/04
[52] U.S. Cl. ...................................... 360/8; 358/145; 360/19; 360/32
[58] Field of Search ............... 360/19, 32, 8, 9, 10, 360/33; 358/145, 147, 12, 13, 143, 144

[56] References Cited
U.S. PATENT DOCUMENTS

| | | | |
|---|---|---|---|
| 2,550,821 | 5/1951 | Kharbanda | 358/145 |
| 2,624,797 | 1/1953 | Lawson et al. | 358/145 |
| 3,748,381 | 7/1973 | Strobele et al. | 360/19 X |
| 3,980,815 | 9/1976 | Kaneko | 360/33 X |
| 4,141,039 | 2/1979 | Yamamoto | 360/32 X |
| 4,156,253 | 5/1979 | Steudel | 358/145 |

Primary Examiner—Robert S. Tupper
Assistant Examiner—Donald McElheny, Jr.

[57] ABSTRACT

A composite video signal recording and reproducing system also records and reproduces an audio signal after their conversion into a digital signal. The recording system converts an input analog audio signal into a digital signal and generates a synchronizing signal corresponding to a synchronizing signal of the composite video signal. There is a time-axis compression of the converted digital signal so that they do not exist in a period corresponding to the synchronizing signal. A level-setter sets the level of the digital signal which has been compressed at a value which is lower than the white peak level of the composite video signal. A mixer mixes the level set digital signal and the generated synchronizing signal, to obtain a composite digital signal. The composite digital signal is supplied to the recording and/or reproducing apparatus and recorded on a recording medium. The level-setter sets the amplitude of the digital signal at a magnitude such that the overshoots and undershoots occurring as a result of the passage of the digital signal through a pre-emphasis circuit of the recording and/or reproducing apparatus will not be clipped by a clipping circuit of the recording and/or reproducing apparatus.

9 Claims, 3 Drawing Figures

SYSTEM FOR RECORDING AND/OR REPRODUCING AN AUDIO SIGNAL WHICH HAS BEEN CONVERTED INTO A DIGITAL SIGNAL

BACKGROUND OF THE INVENTION

The present invention relates generally to systems for recording and/or reproducing audio signals which have been converted into digital signals. More particularly, it relates to systems which convert an analog audio signal into a digital signal and then record and/or reproduce this signal on/from a recording medium by inserting the digital signal between synchronizing signals, which correspond to the synchronizing signals of a composite video signal.

A known recording and reproducing apparatus for audio signals records and reproduces an analog audio signal, as it is originally produced, on and from a traveling magnetic tape. The recording and reproduction is accomplished by means of a fixed head, with unavoidably accompanying by problems such as wow and flutter of the tape travel, and noise, distortion, etc., due to the tape and head systems. As a consequence, these problems have constituted a barrier, limiting efforts to improve the quality of recording and reproducing of audio signals.

Accordingly, there is a method wherein an analog audio signal is converted into a digital signal by a method such as pulse code modulation (PCM). This method, greatly improves the S/N ratio, and reduces the effects such as distortion due to a nonlinearity of the recording medium.

This recording and reproducing of a digital signal requires a recording and reproducing system having a wider band or a greater number of channels than is required in a recording and reproducing system using an analog signal. Accordingly, there is a method using this recording and reproducing apparatus in a video tape recorder (hereinafter referred to as "VTR") which has heretofore been sold on the market and widely used as an apparatus for recording and/or reproducing a composite video signal.

As used herein the term "composite video signal" means a signal composed of an information video signal and synchronizing signals such as vertical synchronizing signals, equalizing pulses, and horizontal synchronizing signals. A VTR of this type is capable of recording/reproducing video signals in a wide band and on a track positioned obliquely on the traveling magnetic tape, by means of rotary heads which scan with a relatively high relative scanning speed.

To record an audio signal through the use of the VTR, an analog audio signal, to be recorded, is converted into a digital signal in an adapter device connected to the VTR. This digital signal is interposed between synchronizing signals which correspond to the synchronizing signals of an ordinary composite video signal. The signal thus obtained is fed to the VTR and recorded on the magnetic tape, by the rotary heads. At the time of reproducing, the signal reproduced from the magnetic tape by the rotary heads in the VTR is fed to the adapter device. There, the synchronizing signals are removed and the digital signal is reconverted into an analog signal and thus restored to the original audio signal.

In general, in order to obtain a large S/N ratio in a recording and reproducing operation in a VTR, a pre-emphasis circuit emphaized the high-frequency range of components, which is readily affected by noise. This pre-emphasis circuit is provided in the recording system. A de-emphasis circuit de-emphasizes the above mentioned high-frequency range of components, thus restoring it to its original state. This de-emphasis circuit is provided in the reproducing system. When a signal having relatively steep rising or falling portions is passed through this pre-emphasis circuit, sharp overshoots and undershoots occur at the instants of this rising and falling. Accordingly, in order to prevent over-modulation due to these overshoots and undershoots, a white clipping and dark clipping circuit is provided for clipping overshoots and undershoots exceeding respective specific values.

In the above mentioned system, according to the conventional practice, the analog audio signal to be recorded has been converted into a digital signal. A level equal to the white peak level of an ordinary video signal becomes "1", while a level equal to the pedestal level becomes "0". However, when a signal which has been converted into a digital signal in this manner passes through the pre-emphasis circuit of the VTR, very great overshoots and undershoots occur at the instants of rising and falling of the digital signal.

When the overshoots and undershoots are clipped by the above mentioned clipping circuits, the clipped signal differs from the original signal. As is apparent also from a Fourier expansion, the discrimination between "1" and "1" of the reproduced digital signal becomes impossible, whereby errors occur in some cases.

SUMMARY OF THE INVENTION

Accordingly, it is a general object of the present invention to provide a novel and useful system for recording and/or reproducing an audio signal which has been converted into a digital signal, wherein the above described problems have been solved.

Another and specific object of the invention is to provide a system which records and/or reproduces in a VTR by converting an analog audio signal into a digital signal. This digital signal has synchronizing signals which correspond to the synchronizing signals of an ordinary composite video signal. At the same time, there is a selection of the amplitude between the "1" and "0" of the digital signal, at a value which is less than the amplitude between the white peak level and the pedestal level of the composite video signal. In accordance with the system of this invention, even when overshoots and undershoots occur at the time when the digital signal passes through the pre-emphasis circuit of the VTR, there is almost no clipping of these shoot components by the clipping circuits. There is no possibility of impairing the digital signal information.

Still another object of the invention is to provide a recording/reproducing system wherein recording/reproducing is carried out by adding a white level reference signal to the digital signal. Irrespective of the nature of the system of the automatic gain control (AGC) circuit ordinarily provided in the recording system of a VTR, good automatic gain control can be accomplished. According to the system of the present invention, good automatic gain control operation is attained despite the fact that the amplitude of the digital signal is set at a low value as mentioned above, for example, even in a peak AGC circuit.

A further object of the invention is to provide a recording and reproducing system capable of an accomplishing excellent writing into a memory circuit in the reproducing system. This writing occurs irrespective of a synchronizing signal and responsive to an even-number field and an odd-number field, similar to the synchronizing signal of an ordinary composite video signal. According to the system of the present invention, the existence of the above mentioned white reference level is detected, and the writing into the memory circuit is started.

Other objects and further features of the invention will be apparent from the following detailed description with respect to preferred embodiments of the invention when read in conjunction with the accompanying drawings.

DETAILED DESCRIPTION

Figure 1:
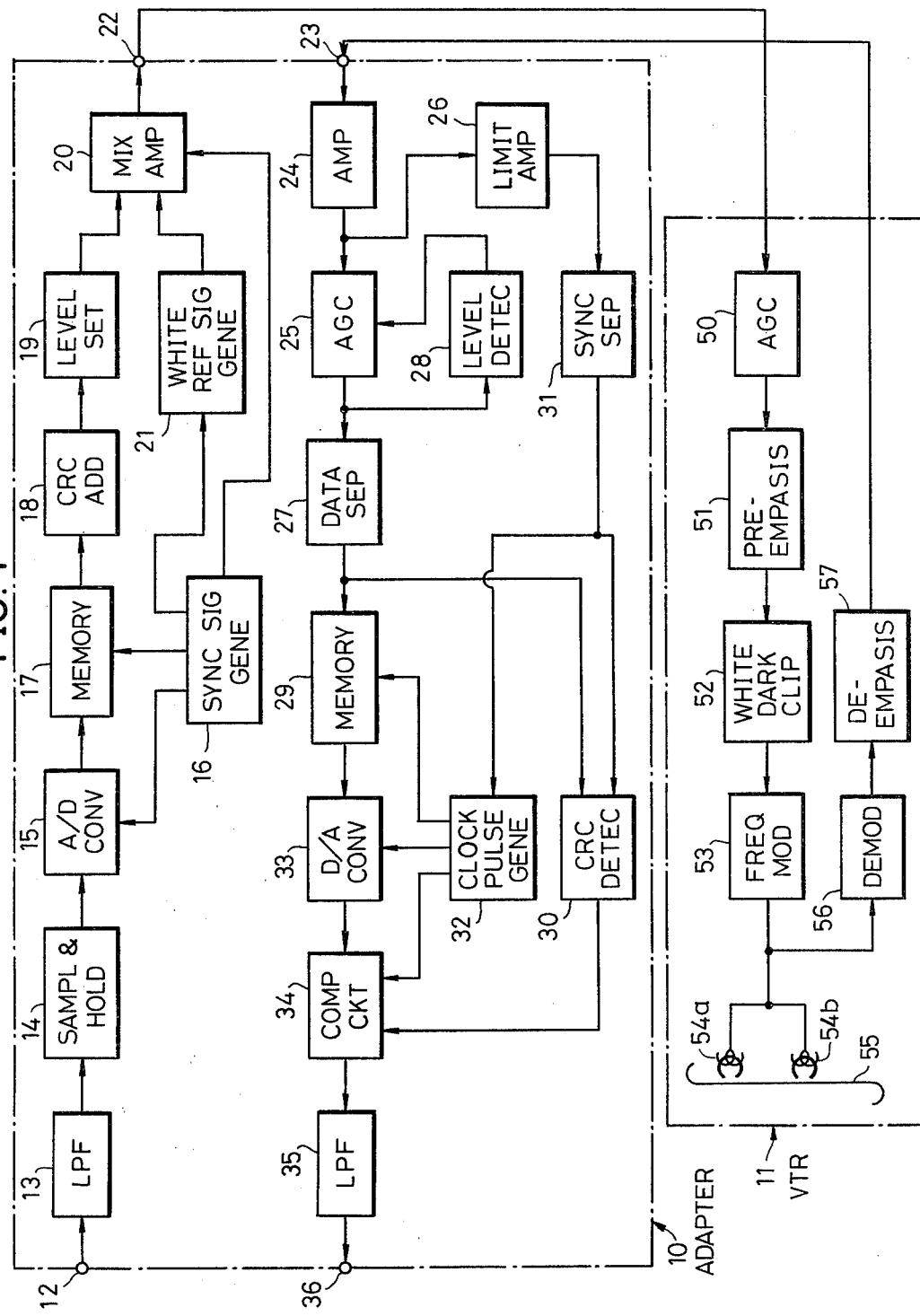
FIG. 1 is a block diagram of one embodiment of the recording/reproducing system according to the invention.

One embodiment of the system of the invention will first be described with reference to FIG. 1. An adapter device 10 according to the present invention is connected, for example, to an ordinary VTR 11 of a simplified type sold on the market.

An analog audio signal to be recorded is fed through an input terminal 12 to a low-pass filter 13 of having a cut-off frequency of, for example, 20 KHz. The resulting output signal of the low-pass filter 13 is supplied to a sampling and holding circuit 14, where it is sampled at a frequency of 44.056 KHz, for example, and held. If a sampled signal has a frequency which is higher than ½ of the sampling frequency, it is converted into a signal having a frequency which is the difference between the frequency of this signal and the sampling frequency, and the difference frequency becomes a noise. For this reason, the frequency component which is higher than approximately ½ of the sampling frequency is cut off by the low-pass filter 13.

The sampled signal is supplied to an analog-to-digital (A/D) converter 15 where it is pulse-code modulated (PCM) by clock pulses from a synchronizing signal generator 16 and thus converted into a PCM signal, which is a kind of digital signal. The method of obtaining a digital signal is not limited to PCM, it being possible to use the delta ($\Delta$) modulation method. The digital signal thus obtained is written into a memory circuit 17 comprising, for example, a random access memory (RAM), where the signal is written (stored) by writing-in clock pulses from the synchronizating signal generator 16.

The digital signal is written as a specific quantity into the memory circuit 17. At the same time, it is read out in a specific sequence by reading-out clock pulses. As a result of this writing and reading of the digital signal into and out of the memory circuit 17, this digital signal is compressed in the time axis direction. The compression prevents the digital signal from appearing in the part where a synchronizing signal is added. At the same time, the compressed signal is subjected to a specific irregular arrangement to enable a compensation for a signal loss or a drop-out, for example, at the time of reproduction.

The digital signal read out from the memory circuit 17, is supplied to a cyclic redundancy check (CRC) signal adding circuit 18. There, at each period equal to one horizontal scanning period (1H), a CRC signal is generated and appended in response to the content of the digital signal within that period. The resulting output signal from this CRC signal adding circuit 18 passes through a level setting circuit 19 comprising a variable resistor, for example, where its level is set and is thereafter supplied to a mixing amplifier 20.

A white level reference signal generator 21 generates, on the basis of a signal from the synchronizing signal generator 16, a white level reference signal having a level substantially equal to the white peak level of an ordinary composite video signal. This signal is fed to the mixing amplifier 20. Furthermore, the synchronizing signal generator 16 generates synchronizing signals and equalization pulses, and supplies them to the mixing amplifier 20. The synchronizing signals correspond to a vertical synchronizing signal and a horizontal synchronizing signal, in an ordinary composite video signal.

Figure 2:
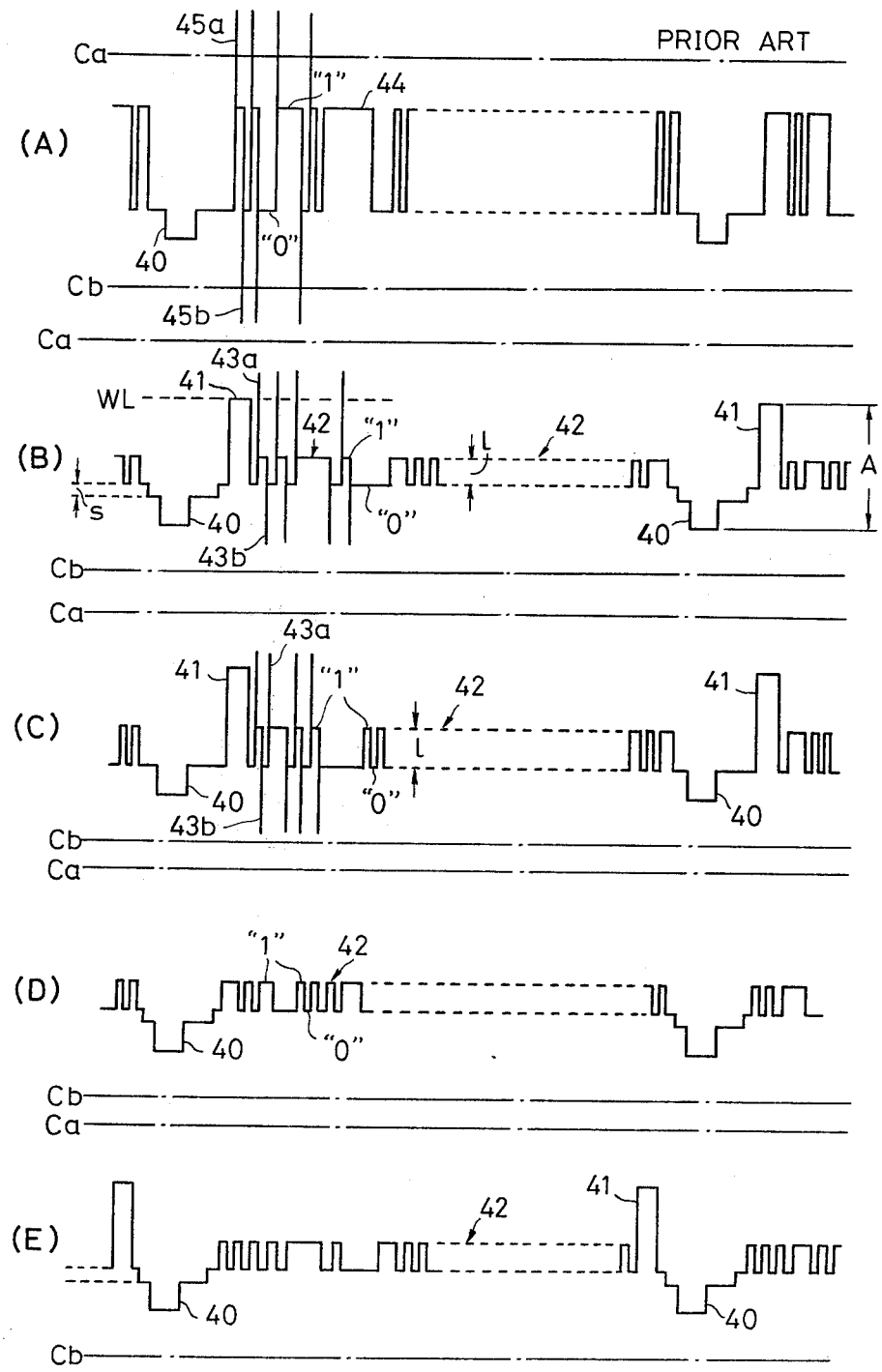
FIG. 2(A) is graph indicating the waveform of a signal of a known system.
FIGS. 2(B) through 2(E) are similar graphs indicating respective examples of signal waveforms of the system of the invention.

The signals fed into the mixing amplifier 20 are mixed, and, led out from this mixing amplifier 20, as a signal indicatd in FIG. 2(B). In FIG. 2(B), it will be observed that, the white level reference signal 41 from the white level reference signal generator 21 is disposed after the horizontal synchronizing signal 40 from the synchronizing signal generator 16. The digital signal 42, to which the CRC signal from the level setting circuit 19 has been added, is interposed between the white level reference signal 41 and the succeeding horizontal synchronizing signal.

The level of the digital signal 42 is so set beforehand by the above mentioned level setting circuit 19 that the level indicating "0" becomes a level which is higher by a specific set-up level s than the pedestal level of the horizontal synchronizing signal. The signal indicating "1" becomes lower than the white peak level WL of an ordinary composite video signal. In the present embodiment of the invention, the amplitude l, between the levels indicating "1" and "0", is set at approximately 30 percent of the amplitude A between the tip end of the synchronizing signal 40 and the white peak level WL. The set-up level s is set at 10 percent of the amplitude A. In this connection, since the amplitude of the synchronizing signal is ordinarily specified to be 30 percent of the amplitude A, it is desirable that the amplitude l be set at approximately ½ to ⅓ of the amplitude between the pedestal level and the white peak level. The smaller the amplitude l of the digital signal 42, the smaller are the overshoots and undershoots, and the possibility of clipping by the clipping circuit disappears. However, since the S/N ratio becomes worse as the amplitude becomes smaller, it is desirable that the amplitude be set at a value within the above stated range.

In the mixing amplifier 20, the above mentioned synchronizing signal 40, white level reference signal 41, and digital signal 42 are mixed. The composite digital signal thus obtained is led out through the output terminal 22 of the adapter and supplied to the VTR 11. After the composite digital signal from the output terminal 22 may be converted into an RF signal by an RF converter (not shown), the resulting RF signal may be fed to the VTR 11.

The composite digital signal fed to the VTR 11 is gain controlled by an automatic gain control (AGC) circuit 50. Thereafter, its high-frequency component is emphasized by a pre-emphasis circuit 51. The resulting output signal of the pre-emphasis circuit 51 is passed through a white-clipping and dark-clipping circuit 52 and thereafter frequency modulated by a frequency modulator 53. The resulting signal is then recorded on a traveling magnetic tape 55 by rotary heads 54a and 54b along a track obliquely orientated relative to the longitudinal direction of the tape. At the time of reproduction, the composite digital signal reproduced from the magnetic tape 55 by the rotary heads 54a and 54b is demodulated by a demodulator 56. Its emphasized high-frequency component is restored to its original state by a de-emphasis circuit 57. The resulting signal is thereafter sent out to the input terminal 23 of the adapter 10.

For the AGC circuit of a VTR of general type, there is a keyed AGC circuit which carries out automatic gain control by detecting fluctuations of the level of the horizontal synchronizing signal. A peak AGC circuit carries out automatic gain control by detecting fluctuations of level between the tip end level of the synchronizing signal or the pedestal level and the white peak level of the composite video signal. According to the system of the present invention, the digital signal 42 is set at a level lower than the white level WL. However, since a white level reference signal 41 exists at every 1H, an excellent AGC operation can be carried out irrespective of whether the AGC circuit 50 is a keyed AGC circuit, or whether it is a peak AGC circuit.

Even when overshoots 43a and undershoots 43b occur as indicated in FIG. 2(B), as a result of the passing of the digital signal 42 through the pre-emphasis circuit 51 in the VTR 11, there is almost no possibility of these overshoots and undershoots respectively exceeding the white clipping level Ca and the dark clipping level Cb of the white clipping and dark clipping circuit 52 in the VTR 11, since the amplitude of the digital signal 42 itself is set as described above. Therefore, even when the digital signal is subjected to signal transmission through the VTR 11, it undergoes no loss whatsoever of its information.

Heretofore, as indicated in FIG. 2(A), the levels of "1" and "0" of the digital signal 44 were made equal to the white peak level and the pedestal level of the ordinary video signals. The amplitude of the signal was set at a large value. For this reason, the overshoots 45a and undershoots 45b would exceed the white clipping level Ca and the dark clipping level Cb, and would be clipped. Consequently, the digital signal 44 would loose its information. According to the present invention, however, as described hereinabove in conjunction with FIG. 2(B), this difficulty of the prior art is overcome.

At the time of reproduction, the composite digital signal reproduced from the magnetic tape in the VTR 11 is introduced through the input terminal 23 into the adapter device 10. There, it is supplied by way of an amplifier to an automatic gain control (AGC) circuit 25 and a limiting amplifier 26. The signal which has passed through the AGC circuit 25 is supplied to a data separation circuit 27 and a level detection circuit 28. The level detection circuit 28 detects the level from relative to the tip end of the synchronizing signal of the white level reference signal. The resulting detection output thereof is used to control the gain of the AGC circuit. As a result, the level fluctuation component of the composite digital signal is removed by the AGC circuit 25. This signal has a specific amplitude.

The data separation circuit 27 separates only the digital signal 42 other than the synchronizing signal and the white level reference signal of the composite digital signal. The digital signal, thus separated, is supplied to a memory circuit 29 comprising a RAM and a CRC signal detection circuit 30.

On the other hand, the amplitudes of the horizontal synchronizing signal, the vertical synchronizing signals, the equalizing pulses, and the white level reference signal are limited by the limiting amplifier 26. Thereafter, these signals are supplied to a synchronizing signal separation circuit 31, where synchronizing signals are extracted. The synchronizing signals, thus extracted, are supplied to the CRC signal detection circuit 30 and a generator 32 for generating clock pulses used during reproduction.

The clock pulse generator 32 operates in response to the extracted synchronizing signals to generate writing-in clock pulses having the same time-axis fluctuation component as the time-axis fluctuation of these synchronizing signals and also to generate reading-out clock pulses of a specific stable frequency. The digital signal from the data separation circuit 27 is written (stored) in the memory circuit 29 responsive to the writing-in clock pulses from the clock pulse generator 32 and, together with a specific quantity of writing in, is read out by the reading-out clock pulses. As a result of the writing and reading of the digital signal into and out of the memory circuit 29, operations may be carried out, such as a time-axis expansion corresponding to the time-axis compression carried out in the recording system. This removes the time-axis fluctuation component accompanying recording and reproducing by the VTR 11. The irregular arrangement carried out in the recording system is restored to the original arrangement of specific sequence. As a consequence of the above mentioned time-axis expansion, the reproduced and separated digital signal is restored to a continuous digital signal which now exists also in a period corresponding to the synchronizing signal.

The output digital signal of the memory circuit 29 is supplied to a digital-to-analog (D/A) converter 33. There, it is reconverted into an analog signal responsive to clock pulses from the synchronizing signal generator 32. This analog signal is fed to a compensation circuit 34. The CRC signal detection circuit 30 checks, by means of a CRC signal, whether or not there are any defects (such as dropouts and errors in information digital signals) other than the CRC signal received within the digital signal from the data separation circuit 27 circuit 30 produces a detection output when there is such a defect. The compensation circuit 34 is controlled by the clock pulses from the clock pulse generator 32 and the detection output signal from the CRC signal detection circuit 30. If there is a defect such as a signal dropout or error, circuit 34 carries out, with respect to the signal from the D/A converter 33, an operation such as inserting a signal between the signals before and after the signal dropout or error or a signal immediately therebefore in order to compensate for the defect.

The resulting signal from the compensation circuit 34 is sent through a low-pass filter 35, where the unnecessary high-frequency component is removed. The resulting signal is led out as a reproduced analog audio signal through an output terminal 36.

At the time of the level setting for the digital signal in the level setting circuit 19, a set-up level need not be provided. The signal waveform in this case becomes as indicated in FIG. 2C. The level indicating "0" of the digital signal 42 becomes equal to the pedestal level. In this case, also, the magnitude of the amplitude between "0" and "1" of the digital signal 42 is, or course, set at a value in the order of ½ to ⅓ of the amplitude A, as in the embodiment of the invention shown in FIG. 2(B). Because the amplitude of the digital signal 42 is set at a small value in this manner, the overshoots 43a and the undershoots 43b due to its passing through the preemphasis circuit 51 are both small. For this reason, the undershoots 43b will not exceed the dark clipping level Cb even if there is no set-up level.

In the case where the AGC circuit 50 of the VTR 11 comprises the keyed AGC circuit, the AGC circuit 50 detects any level fluctuation of the horizontal synchronizing signal 40 in the composite digital signal and thus carries out an automatic gain control. Accordingly, in this case, the white level reference signal 41 is unnecessary, and the white level reference signal generator 21 in the adapter 10 is omitted. The waveform of the composite digital signal obtained in this manner is indicated in FIG. 2D. In this case, the AGC circuit 25 also comprises a keyed AGC circuit. In the present embodiment of the invention, also, the overshoots and undershoots of the digital signal 42 are not clipped, as in the preceding embodiments of the invention.

In the embodiments of the invention of the waveforms shown in FIGS. 2(B) and 2(C), the white level reference signal 41 is provided after the horizontal synchronizing signal 40, that is, in front of the digital signal 42. With this signal arrangement, the leading part of the digital signal 42, after the white level reference signal 41, is somewhat disturbed in some cases by the effect of this white level reference signal 41 of high level. This signal disturbance can be avoided by an arrangement wherein, as indicated in FIG. 2(E), the white-level reference signal 41 is provided after the digital signal 42, that is, before the horizontal synchronizing signal 40.

Figure 3:
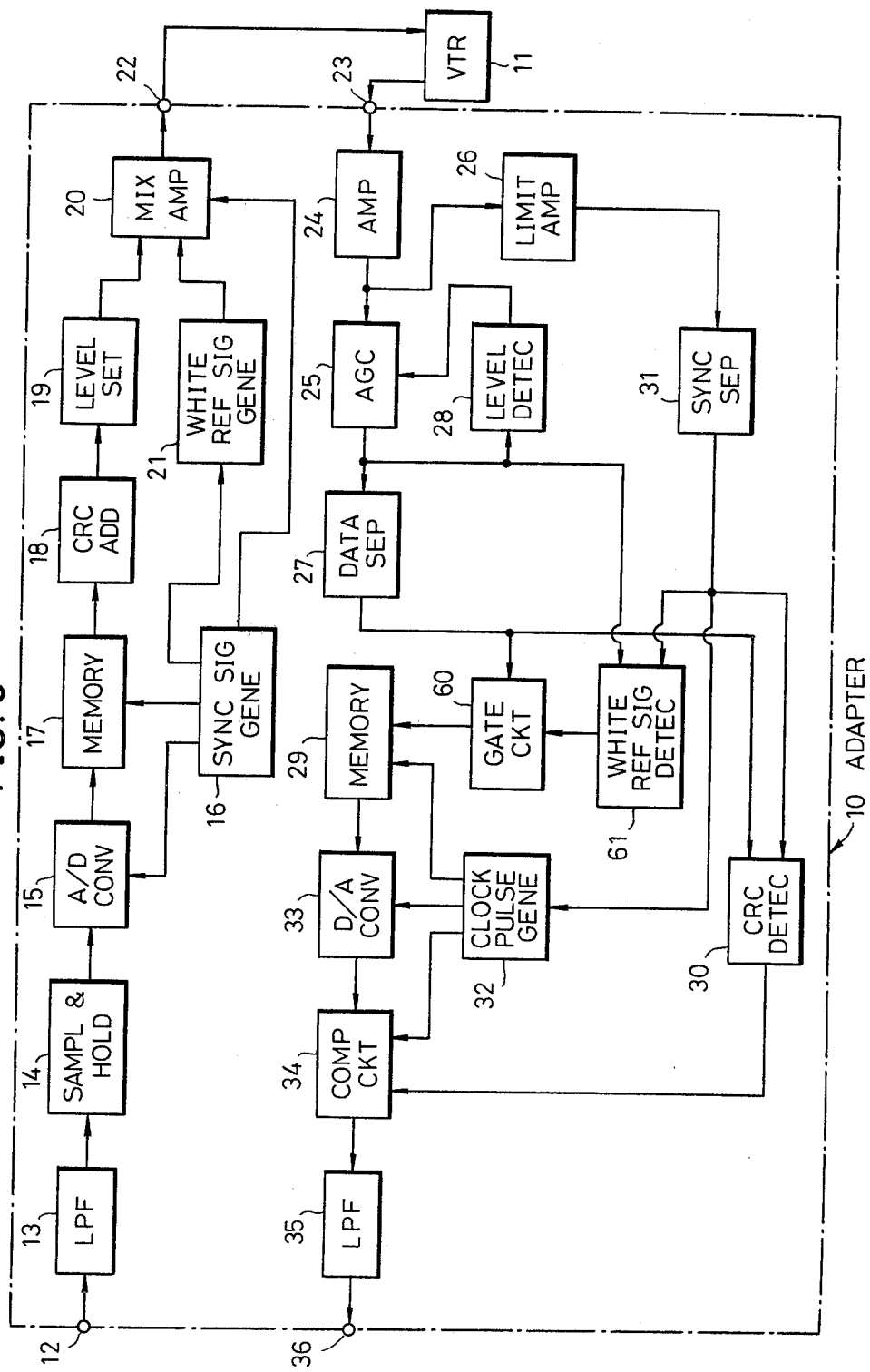
FIG. 3 is a block diagram of another embodiment of the recording/reproducing system according to the invention.

A second embodiment of the system of the invention will now be described with reference to FIG. 3. In FIG. 3, those parts which are the same as corresponding parts in FIG. 1 are designated by like reference numerals. A description of such parts will not be repeated.

In general, an ordinary composite video signal comprises an even-number field and an odd-number field. In the even-number field and the odd-number field, there is a difference of 0.5H in the lengths from the vertical synchronizing signal to the video information signal. In the case of recording and reproducing of the above mentioned composite digital signal, also, since a VTR for recording and reproducing a composite video signal is used, the synchronizing signal used in the composite digital signal, corresponds to the synchronizing signal in the composite video signal. Accordingly, the timing of the writing of the digital signal into the memory circuit 29 in the reproducing system must be made to differ for the even-number field and for the odd-number field.

Accordingly, it has been the practice heretofore to count the number of equalizing pulses after the vertical synchronizing signal for every field and to cause the timing of the start of writing in the digital signal to differ by a period of 0.5H, depending on whether the field is an even-number field or an odd-number field. However, this method is disadvantageous because the circuitry becomes complicated. Accordingly, the present embodiment of the invention is designed to overcome this difficulty.

In this embodiment of the invention, as illustrated in FIG. 3, the digital signal separated in the data separation circuit 27 is supplied to the CRC signal detection circuit 30 and, at the same time, is supplied by way of a gate circuit 60 to the memory circuit 29. On the other hand, the output composite digital signal of the AGC circuit 25 is supplied to the level detection circuit 28 and, at the same time, is supplied to a white level reference signal detection circuit 61.

The white level reference signal detection circuit 61 is supplied with the horizontal synchronizing signal from the synchronizing signal separation circuit 31. By means of a signal obtained by delaying this horizontal synchronizing signal, circuit 61 detects the existence or nonexistence of a white level reference signal in the composite synchronizing signal from the AGC circuit 25. The gate circuit 60 operates every time it receives a detection output from the white level reference signal detection circuit 61. The gate circuit 60 conducts for a specific period after that output and thereby supplies to the memory circuit 29 only the digital information signal out of the signal from the data separation circuit 27. Since a white level reference signal does not exist in the vertical blanking period in which the vertical synchronizing signal and the equalizing pulses exist, the gate circuit 60 is closed in this period.

According to the present embodiment of the invention, the existence of a white level reference signal is detected irrespective of whether the field is an even-number field or an odd-number field, thereby to store the digital signal. For this reason, there is no necessity of counting the equalizing pulses, and the required circuitry is simple.

Further, this invention is not limited to these embodiments. Variations and modifications may be made without departing from the scope of the invention.

What is claimed is:

1. A system for recording an audio signal which has been converted into a digital signal by an apparatus for recording and/or reproducing a composite video signal, the recording system comprising:
    means for converting an input analog audio signal into a digital signal;
    means for generating a synchronizing signal corresponding to a synchronizing signal of the composite video signal;
    means for time-axis compressing the digital signal from the converting means so that the digital signal does not exist in the period corresponding to the synchronizing signal;
    level-setting means for setting the level of the compressed digital signal at a value which is lower than the white peak level of the composite video signal;
    means for mixing the level set digital signal and the generated synchronizing signal to obtain a composite digital signal; and
    means for supplying the composite digital signal to the recording and/or reproducing apparatus,
    the recording and/or reproducing apparatus recording the composite digital signal on a recording medium.

2. A recording system as claimed in claim 1 in which the level-setting means sets the amplitude of the digital signal at a specific value in the range of ½ to ⅓ of the amplitude between the pedestal level and the white peak level of the composite video signal.

3. A recording system as claimed in claim 1 in which the recording and/or reproducing apparatus has a pre-emphasis circuit means for emphasizing the high-frequency component of the composite video signal to be recorded and a circuit means for clipping overshoots and undershoots in the output signal of the pre-emphasis circuit, means whereby the level-setting means sets the amplitude of the digital signal at a magnitude which prevents the clipping circuit from clipping the overshoots and undershoots occurring as a result of the passage of the digital signal through the pre-emphasis circuit means.

4. A system for reproducing a signal recorded by a recording system as claimed in claim 1, the reproducing system comprising: means for time-axis expanding the digital signal in the composite digital signal reproduced by the recording and/or reproducing apparatus in correspondence with the time-axis compression by said compression means so that the digital signal also exists in a period corresponding to the synchronizing signal; and means for converting the time-axis expanded digital signal into an analog audio signal.

5. A system for recording an audio signal which has been converted into a digital signal by an apparatus for recording and/or reproducing a composite video signal, the recording system comprising:
   means for converting an input analog signal into a digital signal;
   means for generating a synchronizing signal corresponding to a synchronizing signal of the composite video signal;
   means for time-axis compressing the digital signal from the converting means so that the digital signal does not exist in the period corresponding to the synchronizing signal;
   level-setting means for setting the level of the compressed digital signal at a value which is lower than the white peak level of the composite video signal;
   means for generating a white level reference signal having a white level corresponding to the white peak level of the composite video signal;
   means for mixing the level set digital signal, the generated synchronizing signal, and the generated white level reference signal to obtain a composite digital signal; and
   means for supplying the composite digital signal to the recording and/or reproducing apparatus, the recording and/or reproducing apparatus recording the composite digital signal on a recording medium.

6. A recording system as claimed in claim 5 in which the white level reference signal is positioned after the horizontal synchronizing signal and before the digital signal.

7. A recording system as claimed in claim 5 in which the white level reference signal is positioned after the digital signal and before the horizontal synchronizing signal in the composite digital signal.

8. A system for reproducing a signal recorded by a recording system as claimed in claim 5, the reproducing system comprising:
   means for time-axis expanding the digital signal in the composite digital signal reproduced by the recording and/or reproducing apparatus in correspondence with the time-axis compression by said compression means so that the digital signal also exists in a period corresponding to the synchronizing signal;
   means for converting the time-axis expanded digital signal into an analog audio signal;
   means for detecting the white level reference signal in the reproduced composite digital signal; and
   gate means operating in response to the resulting detection output of the white level reference signal detection means to control the supply of the reproduced composite digital signal to the time-axis expansion means.

9. A system for reproducing a signal recorded by a recording system as claimed in claim 5, the reproducing system comprising:
   automatic gain control means for detecting any fluctuation in the level of the white level reference signal in the composite digital signal reproduced by the recording and/or reproducing apparatus and for controlling gain with respect to the composite digital signal;
   means for time-axis expanding the digital signal in the output composite signal of the automatic gain control means in correspondence with the time-axis compression in said compression means so that the digital signal exists also in a period corresponding to the synchronizing signal; and
   means for converting the time-axis expanded digital signal into an analog audio signal.

* * * * *